US012633184B2

(12) United States Patent
Trösch et al.

(10) Patent No.: US 12,633,184 B2
(45) Date of Patent: May 19, 2026

(54) ACCESS CONTROL SYSTEM AND METHOD FOR OPERATING AN ACCESS CONTROL SYSTEM

(71) Applicant: INVENTIO AG, Hergiswil (CH)

(72) Inventors: Florian Trösch, Erlenbach (CH); Armin Wittneben, Zürich (CH); Henry Ruben Lucas Schulten, Zürich (CH); Janick Daniel Zwyssig, Sisikon (CH); Marc Kuhn, Gockhausen (CH)

( * ) Notice: Subject to any disclaimer, the term of this patent is extended or adjusted under 35 U.S.C. 154(b) by 658 days.

(21) Appl. No.: 17/511,359

(22) PCT Filed: Apr. 24, 2020

(86) PCT No.: PCT/EP2020/061410
§ 371 (c)(1),
(2) Date: Dec. 21, 2023

(87) PCT Pub. No.: WO2020/216877
PCT Pub. Date: Oct. 29, 2020

(65) Prior Publication Data

US 2024/0249577 A1 Jul. 25, 2024

(30) Foreign Application Priority Data

Apr. 26, 2019 (EP) .................................... 19171358

(51) Int. Cl.
*G07C 9/20* (2020.01)

(52) U.S. Cl.
CPC ........... *G07C 9/20* (2020.01); *G07C 2209/61* (2013.01); *G07C 2209/63* (2013.01)

(58) Field of Classification Search
CPC .. G07C 9/20; G07C 2209/61; G07C 2209/63; G07C 9/28; G07C 9/22; G01S 5/021;
(Continued)

(56) References Cited

U.S. PATENT DOCUMENTS 9,442,179 B2 * 9/2016 Do ........................ G01S 5/0236
9,483,887 B1 11/2016 Soleimani
(Continued)

FOREIGN PATENT DOCUMENTS

CN 101583147 A 11/2009
CN 102395192 A 3/2012
(Continued)

OTHER PUBLICATIONS

Daan Scheerens et al: "Practical Indoor Localization using Bluetooth Master Thesis Supervising committee", Jan. 31, 2012 (Jan. 31, 2012), XP055254387, retrieved from the Internet: URL:http://essay.utwente.nl/61496/1/ MSc_D_Scheerens.pdf [retrieved on Mar. 1, 2016].*

(Continued)

*Primary Examiner* — Omar Casillashernandez
(74) *Attorney, Agent, or Firm* — Schlee IP International, PC; Alexander R. Schlee; Pascal A. Schlee

(57) ABSTRACT

In an access control system for a building, a security gate separates a restricted-access zone from a public zone. Radio devices are arranged at established distances from the security gate and define a monitoring area. A control device of the system is communicatively coupled to a building device, and a data storage device stores processing instructions for situation-specific calibration modes. A signal processing device evaluates the radio communication in the monitoring area, determines at least one situation indicator therefrom which indicates a radio situation prevailing in the monitoring area and, for each radio device, captures a received signal strength indicator and uses it to determine at least one situation indicator ($RSSI_i$) based on radio communication with a first wireless device. The signal processing device selects a calibration mode assigned to the at least one situation indicator and reads the processing instructions
(Continued)

assigned to this calibration mode from the data storage device. The signal processing device determines a current position (P') of the first wireless device as a function of the received signal strength indicators ($RSSI_i$) according to the processing instructions that have been read.

12 Claims, 6 Drawing Sheets

(58) Field of Classification Search
CPC ....... G01S 5/0278; H04W 4/33; H04W 4/029; G01C 21/206
USPC ........................................................... 340/5.7
See application file for complete search history.

(56) References Cited

U.S. PATENT DOCUMENTS

| | | | | |
|---|---|---|---|---|
| 2005/0012656 | A1 | 1/2005 | Reisman et al. | |
| 2012/0225663 | A1* | 9/2012 | Gupta | H04W 64/00 455/456.1 |
| 2015/0172872 | A1 | 6/2015 | Alsehly et al. | |
| 2016/0027226 | A1* | 1/2016 | Gigl | G07C 9/00309 340/5.61 |
| 2016/0241559 | A1 | 8/2016 | Trani et al. | |
| 2016/0284147 | A1* | 9/2016 | Trani | G01S 5/02 |
| 2018/0144563 | A1 | 5/2018 | Reymann | |
| 2019/0182672 | A1* | 6/2019 | Kuenzi | H04W 12/084 |
| 2019/0289568 | A1* | 9/2019 | Pajovic | H04W 64/003 |
| 2022/0103973 | A1* | 3/2022 | Sirotkin | H04W 4/029 |

FOREIGN PATENT DOCUMENTS

| | | | | |
|---|---|---|---|---|
| CN | 104599354 A | | 5/2015 | |
| CN | 109005390 A | | 12/2018 | |
| DE | 102009021783 A1 | | 9/2010 | |
| WO | WO2010112586 A1 | | 10/2010 | |
| WO | WO-2018227120 A1 | * | 12/2018 | H04W 12/08 |

OTHER PUBLICATIONS

Scheerens, Daan, "Practical Indoor Localization using Bluetooth", Master Thesis, Jan. 2012, Faculty of Electrical Engineering, Mathematics and Computer Science, University of Twente ",Enschede, Netherlands".

Schulten, Henry et al., "On the Crucial Impact of Antennas and Diversity on BLE RSSI-based Indoor Localization", 2019 IEEE 89th Vehicular Technology Conference, IEEE Apr. 28, 2019, 6 pages.

Li et al., A Signal Strength Sorted Location Algorithm Using a Single Set of Anchor, Journal of Navigation and Positioning, vol. 2, No. 4, Dec. 2014.

Yang et al., A Novel Radio Map Construction Method for Indoor Localization Based on Voronoi Digram and Bayesian Approach, Journal of Chongqing Normal University (Natural Science), vol. 33, No. 4, Jul. 2016.

Kasantikul et al., An Enhanced Technique for Indoor Navigation System Based on WIFI-RSSI, Master Program of Space Technology and Application, School of Electronic and Information Engineering, Beihang University, Beijing China, 2015 Seventh International Conference on Ubiquitous and Future Networks (Jul. 7-10, 2015); added to IEEE Xplore Aug. 10, 2015.

* cited by examiner

ACCESS CONTROL SYSTEM AND METHOD FOR OPERATING AN ACCESS CONTROL SYSTEM

CROSS-REFERENCE TO RELATED APPLICATIONS

This application is the national phase application under 35 U.S.C. § 371 claiming the benefit of priority based on International Patent Application No. PCT/EP2020/061410, filed on Apr. 24, 2020, which claims the benefit of priority based on European Patent Application No. 19171358.5 filed on Apr. 26, 2019. The contents of each of these applications are hereby incorporated by reference in their entirety.

FIELD OF THE INVENTION

The technology described herein relates, in general, to an access control system that grants an authorized user access to an access-restricted zone in a building or site. Embodiments of the technology relate, in particular, to an access control system having a transceiver device for radio signals and to a method for operating such an access control system.

BACKGROUND OF THE INVENTION

Access control systems may be configured in a variety of different ways. The embodiments may relate, for example, to the way in which users (persons) must identify themselves as authorized to access, for example, with a key, a magnetic card, a chip card or an RFID card or with a mobile electronic device (for example, mobile phone). WO 2010/112586 A1 describes an access control system, in which a mobile phone carried by a user sends an identification code to an access node. If the identification code is identified as valid, the access node sends an access code to the cell phone, which displays the access code on a display. If the user holds the cell phone to a camera so that it can detect the displayed access code, the access control system checks whether the detected access code is valid. If the code is valid, the user is granted access.

In buildings with many floors, there may be a high volume of traffic at certain times of the day, for example in an entrance hall of an office building when a large number of employees enter the building in the morning or after a lunch break to arrive at their workplaces. At these times, high demands are placed not only on the efficiency of an elevator system installed in the building, but also on the access control system in order, for example, to avoid queuing at a security gate between a public zone and a restricted-access zone as much as possible. There is therefore a need for an access control system that fulfills these requirements, wherein the access control is nevertheless able to reliably distinguish persons having access authorization from persons who are not authorized.

SUMMARY OF THE INVENTION

One aspect of such a technology relates to a method of operating an access control system to control access to a restricted-access zone in a building in which a security gate separates the restricted-access zone from a public zone. The system comprises radio devices which are each arranged at a fixed distance from the security gate and which define a monitoring area. The radio devices are configured for radio communication with wireless devices that are within radio range and assigned to users, wherein a first wireless device at a first position of a first user is at a distance from each of the radio devices. A control device of the system is communicatively coupled to a building device, and a data storage device stores processing instructions for situation-specific calibration modes. A signal processing device is communicatively coupled to the data storage device, the radio devices, and the control device. The method evaluates radio communication in the monitoring area and, based on the evaluation, determines a situation indicator which shows a radio situation prevailing there. For each radio device, an indicator for a received signal field strength is recorded based on radio communication with the first wireless device. The method selects a calibration mode assigned to the situation indicator and reads the processing instructions assigned to it from the data storage device. A current position of the first wireless device is determined as a function of the detected indicators for the received signal field strengths in accordance with the processing instructions that have been read.

Another aspect of the technology relates to a system for controlling access to a restricted-access zone in a building. The system comprises radio devices which are each arranged at a fixed distance from the security gate and which define a monitoring area. The radio devices are configured for radio communication with wireless devices that are within radio range and assigned to users, wherein a first wireless device at a first position of a first user is at a distance from each of the radio devices. A control device of the system is communicatively coupled to a building device, and a data storage device stores processing instructions for situation-specific calibration modes. A signal processing device is communicatively coupled to the data storage device, the radio devices, and the control device. The signal processing device is configured to evaluate the radio communication in the monitoring area and to determine at least one situation indicator therefrom, which indicates a radio situation prevailing in the monitoring area. In addition, the signal processing device is configured, for each radio device, to detect a received signal field strength indicator based on a radio communication with the first wireless device and to select the calibration mode assigned to the at least one situation indicator. The signal processing device is also configured to read the processing instructions assigned to the selected calibration mode from the data storage device and to determine a current position of the first wireless device as a function of the received signal field strength indicators detected according to the processing instructions read.

The technology described here creates an access control system in which, in order to determine the position, it is first assessed which radio situation currently prevails in the monitoring area, and the calibration mode is then selected as a function of the radio situation. The selected calibration mode determines the processing instructions with which the current position of a user is determined. This allows the position determination to be flexibly adapted to the prevailing radio situation in order to be able to determine the position as precisely as possible even in the prevailing radio situation.

When traffic is high, for example, many users interfere with the propagation of a radio signal, resulting in increased signal weakening and signal shadowing. The radio signal therefore propagates differently in such a situation than during a reference situation with a single user moving along an established reference path. Processing instructions based on this reference situation may therefore not provide the most precise position determination. In one embodiment, a calibration mode can therefore be selected that takes the high volume of traffic into account. On the other hand, if the traffic volume is low, the processing instructions can be based on the reference situation.

The number of users can also indicate the number of active wireless devices present in the monitoring area. The number of wireless devices can therefore be selected as a situation indicator in one embodiment. As an alternative to the number of wireless devices or in addition, depending on the configuration of the access control system, e.g. depending on the conditions in the building, at least one of the following situation indicators can be selected: a wireless device type, a spatial orientation of a wireless device, an entry point of the user in the monitoring area, sensor data generated by a wireless device, a time, a number of radio devices, an available computing power in the access control system, a density of radio equipment or a room size. These options allow a building-specific adaptation.

The technology described here detects a large number of received signal strength indicators and processes them according to a calculation model, wherein the calculation model depends on the selected calibration mode. It is advantageous that the received signal strength indicators are easy to determine and that their determination and monitoring is already provided for in known norms and standards for radio communication. In these norms and standards, a received signal field strength indicator is also referred to as a Received Signal Strength Indicator (RSSI). An exemplary standard relates to Bluetooth technology, e.g. the Bluetooth Low Energy (BLE) technology.

In one embodiment of the technology described here, radio signals are transmitted and evaluated in accordance with Bluetooth technology, in particular BLE technology. This is an advantage above all because this technology is usually available in wireless devices and users can also use the device they are familiar with in conjunction with the access control system. This is done in a convenient way for a user because, for example, the user does not have to handle the wireless device when he wants access.

The data storage device stores data determined in a calibration phase which can be read in an application phase. The data relate, for example, to a radio signal strength reference value that was determined in the calibration phase from radio communication between one of the radio devices and a reference wireless device arranged at a reference distance for this purpose. The data can also relate to a reference radio signal pattern as a function of a position of the reference wireless device, wherein the reference radio signal pattern is determined from the radio communication between the radio devices and the reference wireless device in the calibration phase. In addition, the data can relate to a loss coefficient determined in the calibration phase for each of the radio devices as a function of the reference position of the reference wireless device.

In one embodiment, first processing instructions for a first calibration mode can determine the position according to $$P' = \arg\min_{p} \sum_{i=1}^{N_A} w_i \left(\log d_i(p) - \log d_i'\right)^2$$

where $N_A$ is a number of radio devices and $d_i(p)$ is a Euclidean distance between an i-th radio device (6) and a variable position (p) of the user (4), wherein a distance (d'i) between the wireless device (2) and an i-th radio device (6) determined based on the reference radio signal pattern (FP) results as follows:

$$d_i' = d_0 10^{\frac{M\left(RSSI_{d_0}\right) - RSSI_i}{10\alpha}}.$$

The loss coefficient is defined according to $$\alpha_{i,k} = \frac{\sum_{j=1}^{N_{j,k}} \log_{10}\left(\frac{d_{i,k,j}}{d_0}\right)\left(M\left(RSSI_{d_0}\right) - RSSI_{i,k,j}\right)}{10 \sum_{j=1}^{N_{j,k}} \log_{10}^2\left(\frac{d_{i,k,j}}{d_0}\right)}$$

where j=1, . . . , $N_{j,k}$ denotes the j-th measurement in a k-th path segment of an established path for the i-th radio device, wherein the path segments are established in a calibration phase.

In one embodiment, second processing instructions can establish a trajectory of a movement of the user to be determined for a second calibration mode, wherein the determination is based on the established locations of the radio devices, the detected indicators for the received signal field strengths and the radio signal strength reference value, wherein loss coefficients using a maximum likelihood estimate are determined, wherein residual costs are determined according to a negative log-likelihood function, taking into account the loss coefficients determined and wherein the residual costs are minimized over the position path.

In one embodiment, the data storage device also stores an individual identifier of the first wireless device, which is transmitted by the first wireless device. The identifier can be used to infer the user who owns the first wireless device. In one embodiment, it can thus be checked whether the user is authorized to access. In the access control system, the signal processing device is configured to feed a control signal to the control device when an established rule is met based on the identifier and the determined current position of the wireless device. The control device is configured to initiate a building action corresponding to the established rule, in particular to release the security gate.

BRIEF DESCRIPTION OF THE DRAWINGS

Various aspects of the improved technology are described in greater detail below with reference to embodiments in conjunction with the drawings. In the drawings, identical elements have identical reference signs. In the drawings.

DETAILED DESCRIPTION OF EMBODIMENTS OF THE INVENTION

Figure 1:
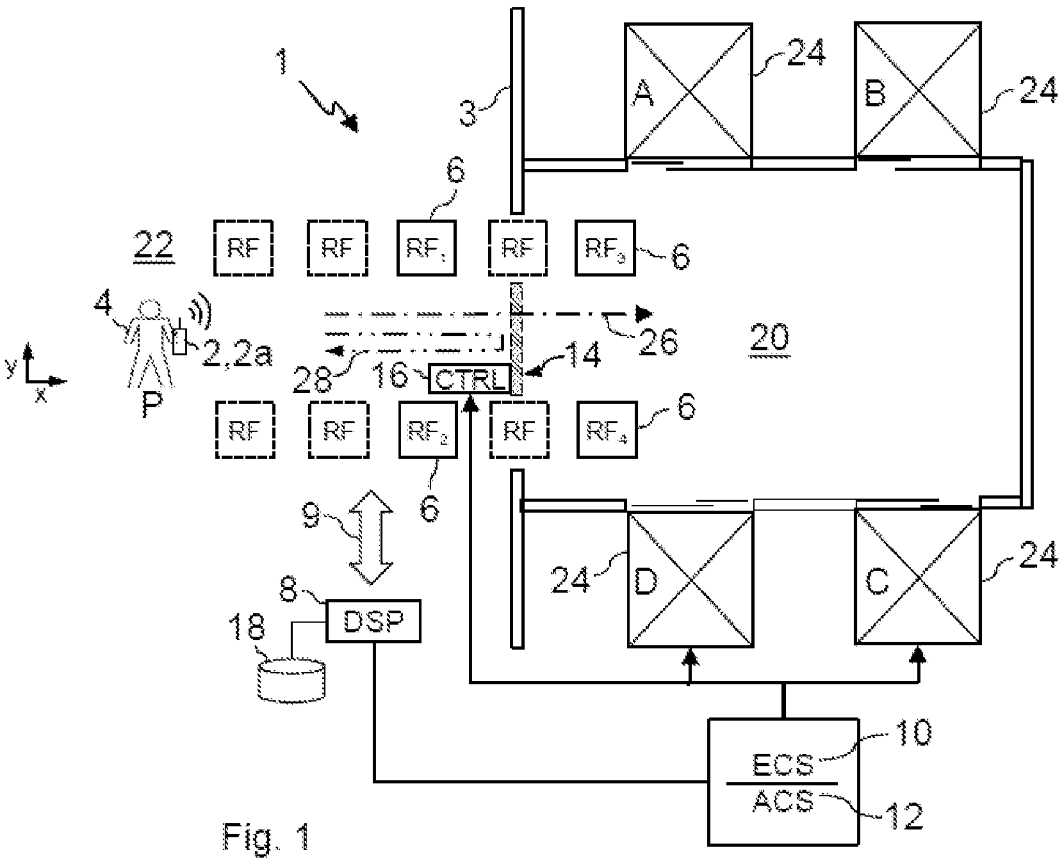
FIG. 1 is a schematic illustration of an exemplary situation in a building having an access control system according to one embodiment.

FIG. 1 is a schematic illustration of an exemplary situation in a building having an access control system 1. For purposes of illustration, only a few walls 3, rooms 24 and zones 20, 22 of the building are shown. The rooms 24 may be e.g. apartments, halls and/or elevator cars of an elevator system. In the situation shown in FIG. 1, there is a user 4 in zone 22 who has a wireless device 2 with him. The zone 22 is not subject to access restrictions in these exemplary situations and is also hereinafter referred to as the public zone 22. A security gate 14 separates the public zone 22 from the zone 20 which is subject to access restrictions and adjoins the rooms 24. The zone 20 is also hereinafter referred to as the restricted-access zone 20. A person skilled in the art recognizes that, depending on the building situation, each room 24 can be viewed as a restricted-access zone 20. The term "building" in this description is to be understood as meaning residential and/or commercial buildings, sports arenas, airports or ships, for example.

According to one embodiment, the access control system 1 comprises radio devices 6, for example four radio devices 6 identified by $RF_1$, $RF_2$, $RF_3$, $RF_4$. The person skilled in the art recognizes that in another embodiment more than four radio devices 6 (generally $RF_i$, with i=1, 2, . . . . N) can be arranged, which is indicated in FIG. 1 by radio devices (RF) shown in dashed lines. Each of the radio devices 6 transmits and receives radio signals during operation in accordance with an established standard for radio communication, as stated elsewhere in this description.

The radio devices 6 are arranged stationary at fixed locations: these locations can be specified in relation to a building plan, for example for a building floor using x-y coordinates. The location of the security gate 14 can be specified in a similar manner for a building floor by means of x-y coordinates. In one embodiment, data indicating the locations of the radio devices 6 and the location of the security gate 14 are stored in the access control system 1, for example in a data storage device 18 (hereinafter also referred to as storage device 18).

The radio devices 6 arranged in this way define a region that is monitored by the access control system 1: this region is referred to below as the monitoring area. Depending on the building situation, the monitoring area can, for example, border on a main entrance door, a landing entrance or an elevator door, the locations of which are also specified in the building plan and are therefore known. If a user 4 enters the monitoring area through such a door, for example a door movement can be detected, a current position of the user 4 results from the known location of this door. Since the user 4 is moving away from the door, this current position can be viewed as the starting position of the movement in the monitoring area. In one embodiment, a radio device 6 can be arranged at a prominent location, such as the said doors, to define this location as the starting position.

The access control system 1 also comprises a signal processing device 8 (shown as a DSP) and a control device 10, 12 connected to the signal processing device 8. The memory device 18 is also connected to the signal processing device 8. The signal processing device 8 is communicatively coupled to the radio devices 6, which is indicated by a double arrow 9. The control device 10, 12 comprises a control system 12 (shown in FIG. 1 as ACS) for the access control system 1, which, for example, checks an access authorization and, depending on the result of this check, activates a building device. The building device can be a control device 16 (CTRL) for the security gate 14 or a control system 10 for an elevator system (shown as ECS in FIG. 1). In relation to the elevator system, some or all of the rooms shown are 24 elevator cars. In FIG. 1, the control device 10, 12 comprises the control system 10 for the elevator system. Those skilled in the art will recognize that the control system 12 for the access control system 1 and the control system 10 for the elevator system can be separate systems and can accordingly be represented as separate systems.

In the situation shown in FIG. 1, the technology described herein may be advantageously used to operate the access control system 1 with as little complexity as possible, and to grant the user 4 convenient access to the restricted-access zone 20. A person skilled in the art recognizes that more than one user 4 can be in the monitoring area. Summarized briefly and by way of example, the access control system 1 according to one embodiment is operated as follows:

The technology determines a position of the user 4 using a calculation model, also referred to below as a channel model, which describes transmission losses of the radio signals that propagate between the wireless device 2 and the radio devices 6. As a measure of the transmission losses, the channel model uses indicators for received signal strength indicators (RSSI), which are determined for the current position with respect to the individual radio devices 6. This channel model is adapted dependent on a radio situation prevailing in the monitoring area, e.g. a number of cellular devices 2 present, their types (e.g. iPhone devices or Android devices) and/or directional information (e.g., position/orientation of a wireless device 2), and a situation indicator determined therefrom. The adaptation takes place according to a calibration mode selected for the radio situation: the selected calibration mode can be based on previously determined and saved values (e.g., reference values) or manage without such a prior value determination. This technology implemented in the access control system 1 improves the accuracy of the position determination. In one embodiment, the improvement in accuracy is supported in that the radio signals are sent in accordance with a standard for Bluetooth technology and/or that the highest possible degree of diversity is provided in the access control system 1 (as explained elsewhere in this description).

Since the locations of the radio devices 6 are known/established, in particular in relation to the security gate 14, the position of the user 4 in relation to the radio devices 6 or the security gate 14 results from the determination of the position of the wireless device 2. It can thus be determined, for example, how far the user 4 is from the security gate 14 and/or in which direction he is moving, e.g. towards the security gate 14 or away from it. A radio signal sent by the wireless device 2 includes an individual identifier (e.g. device ID, serial number, device address), by means of which it can be checked whether the user 4 is authorized to access, should he want access and not just be walking past the lock 14. If the user 6 moves along one of the paths 26, 28 shown by way of example in FIG. 1, the position of the user 4 that changes over time (also referred to as a trajectory) can be tracked. For this purpose, position determinations are carried out at established discrete time intervals: the time intervals can be selected depending on the radio technology, for example. If a comparison of the determined position with the location of the security gate 14 shows that the user 4 is at the security gate 14, a corresponding building action is initiated if an established rule is satisfied: for example, if the access authorization is determined, he is granted access.

The channel model and the options for adapting the channel model are described in more detail below. In addition, further properties of the access control system 1 and its components are indicated.

In the embodiment shown, the radio devices 6 of the access control system 1 are arranged in the public zone 22 and in the restricted-access zone 20. As a result, the monitoring area extends over both zones 20, 22. In the situation with four radio devices 6 shown in FIG. 1, there are two radio devices 6 ($RF_1$, $RF_2$) in the public zone 22 and two radio devices 6 ($RF_3$, $RF_4$) in the restricted-access zone 20. The person skilled in the art recognizes that in another embodiment the radio devices 6 can only be arranged in one of the two zones 20, 22 and that the number and arrangement of the radio devices 6 can be selected depending on the conditions in the building. Arranging the radio devices 6 in both zones 20, 22, i.e. on both sides of the security gate 14, however, has the advantage that the position is determined with substantially the same accuracy, regardless of the direction in which the user 4 is moving.

The security gate 14 separates the restricted-access zone 20 from the public zone 20. Depending on the building and its requirements, the security gate 14 may be a physical barrier, e.g. a door, a revolving or sliding door, a barrier or a turnstile, or be configured without such a physical barrier. The access control system 1 uses the security gate 14 to ensure that only authorized users 4 can enter the restricted-access zone 20, for example by blocking or releasing the physical barrier. In the case of security gates 14 without a physical barrier, the access control system 1 can, for example, control access by initiating a security measure when an unauthorized user 4 enters the restricted-access zone 20, e.g. an optical and/or acoustic alarm is triggered: alternatively or in addition, a notification of a security service can be initiated. Regardless of whether or not the security gate 14 is equipped with a physical barrier, an information device that may be present can also be activated in order to, for example, inform a user 4.

Figure 2:
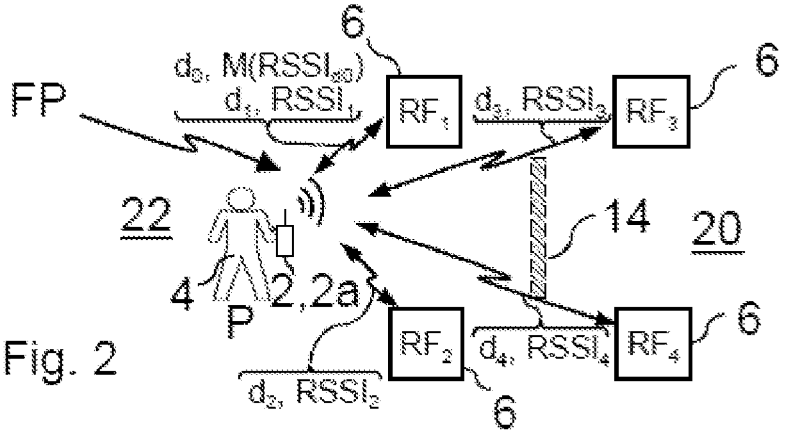
FIG. 2 is a schematic illustration of an exemplary radio communication situation for the situation in the building shown in FIG. 1.

FIG. 2 shows a schematic illustration of an exemplary radio situation for the situation in the building shown in FIG. 1. In FIGS. 1 and 2, the user 4 is at a position P, which is referred to as the (actual) position P in the following. The technology described here uses the channel model to determine the position of the wireless device 2 and thus the position of the user 4. The position of the user 4 determined in this way is hereinafter referred to as the position P': it can be the same as the actual position P of the user 4, but it can also differ more or less therefrom, especially under real conditions in the building.

In FIGS. 1 and 2, the four radio devices 6 ($RF_1$, $RF_2$, $RF_3$, $RF_4$) are shown, which are arranged in the region around the security gate 14. The user 4 and the wireless device 2 are at the (actual) position P, from which they are each a distance from one of the radio devices 6: in FIG. 2 these are the distances $d_1$, $d_2$, $d_3$, $d_4$ (generally $d_1$, with i=1, 2, . . . . N). In FIG. 2 it is assumed that radio signals are transmitted and received between the wireless device 2 of the user 4 and each radio device 6. For each of these radio signals, a received signal strength indicator ($RSSI_i$) can be determined for position P: in FIG. 2 these are the received signal strength indicators $RSSI_1$, $RSSI_2$, $RSSI_3$, $RSSI_4$. To illustrate this, FIG. 2 shows a pair of values for each radio signal or each radio connection, which indicates a distance $d_i$ and the received signal strength indicator $RSSI_i$ measured for it, where i=1, 2, . . . , N (number of radio devices 6).

A characteristic radio pattern FP (also referred to as radio fingerprint FP) results from these radio signals for the position P of the user 4. In one embodiment, the radio fingerprint FP includes all received signal strength indicators $RSSI_i$ measured for position P; in FIG. 2, these are the four received signal strength indicators $RSSI_1$, $RSSI_2$, $RSSI_3$, $RSSI_4$. If the position P changes, one or more of these received signal strength indicators $RSSI_1$, $RSSI_2$, $RSSI_3$, $RSSI_4$ changes as a rule. The knowledge of the received signal strength indicators $RSSI_i$ measured for a position, that is to say of the radio fingerprint FP determined for this position, can be used in one embodiment to approximately determine a position of a wireless device 2. The received signal strength indicators $RSSI_i$ and the radio pattern FP can be stored in the storage device 18.

FIG. 2 also shows a situation which, according to one embodiment, is used to determine one or more reference values. The reference value or values determined in this way can be used in a calibration mode. In the situation shown, the user 4 has a reference wireless device 2*a* and is at a distance do from a radio device 6 selected for determining reference values: in FIG. 2, this is the radio device 6 labeled $RF_1$. A specific reference value is drawn as $RSSI_{d_0}$. Further information on this is given elsewhere in this description.

The person skilled in the art recognizes that the mentioned highest possible degree of diversity can be achieved in various ways. In communications engineering, diversity technology is used for redundant transmission of data via stochastically independent channels that are only prone to errors with a low probability at the same time. Various forms of diversity operating modes are known: with time diversity, the information in the user data is time-shifted several times and thus transmitted several times over the same radio channel in order to compensate for time-dependent fluctuations in the signal strength. In the case of spatial diversity, two or more transmit-receive paths are operated. This is mostly realized by spatially separated antennas that are operated in parallel. Depending on the method, the receiving device then selects, for example, from the strongest received signal. With frequency diversity, the same signal is transmitted over two or more different carrier frequencies at the same time. In the event of interference or a complete signal cancellation, it is to be expected that not all frequency ranges used will be affected.

In one embodiment of the technology described here, the radio communication between the wireless device 2 (or the reference wireless device 2*a*) and the radio devices 6 takes place in accordance with a standard for Bluetooth technology, e.g. Bluetooth Low Energy (BLE) (hereinafter referred to as BLE technology); the wireless device 2 (2*a*) and the radio devices 6 are equipped with corresponding devices for this purpose. As an alternative to BLE technology, other known radio technologies can be used, e.g. a WLAN/WiFi technology. The wireless device 2 sends, for example, an attention notice referred to as an advertising event as a radio signal. All radio devices 6 located within radio range receive this radio signal, and each of these radio devices 6 can determine the signal strength of the radio signal it receives, from which the received signal strength indicator $RSSI_i$ results. The person skilled in the art recognizes that this process can also take place in reverse, i.e. each radio device 6 sends an advertising event as a radio signal and the wireless device 2 uses this to determine the signal strengths or the received signal strength indicators $RSSI_i$ (further explanations are given below).

In one embodiment of the BLE technology (Bluetooth 5.0), three main radio channels are used, each of which has a relatively small bandwidth and is separated from one another by a relatively large frequency spacing: further details on the BLE technology, in particular on the communication protocol, are known to the person skilled in the art, so that explanations on this do not appear to be necessary at this point. In one embodiment, diversity can be implemented by averaging measurements of the received signal strength indicators $RSSI_i$ which follow one another in time. These are normally independent of time, as they are transmitted over different radio channels and thus over different frequencies.

A person skilled in the art recognizes that the received signal strength indicators $RSSI_i$ can be measured by the wireless device 2 (or the reference wireless device 2*a*) and/or by the radio devices 6 or the signal processing device 8. For example, in a first case, the radio devices 6 can continuously send advertising event packets. The wireless device 2 receives these packets and can determine all received signal strength indicators $RSSI_i$ associated therewith. The measured values are now available on the wireless device 2. A software application (also referred to as an "app") can now determine the position of the wireless device 2 according to the technology described here and, if necessary, also use sensor values (IMU data) generated by a sensor module (IMU, Inertial Measurement Unit) of the wireless device 2, since these are also present on the wireless device 2. The access control system 1 is then informed of the determined position by the wireless device 2.

In the opposite (second) case, the wireless device 2 continuously sends out advertising event packets. The radio devices 6 receive these packets and can determine all received signal strength indicators $RSSI_i$ associated therewith. The measured values are now available in the radio devices 6 and can be stored in the memory device 18 provided with a time stamp. The signal processing device 8 processes this data in accordance with the technology described here in order to determine the position of the wireless device 2. IMU data can be transmitted from the wireless device 2 to the signal processing device 8 and used in determining the position. The following describes the technology based on the second case.

Figure 3:
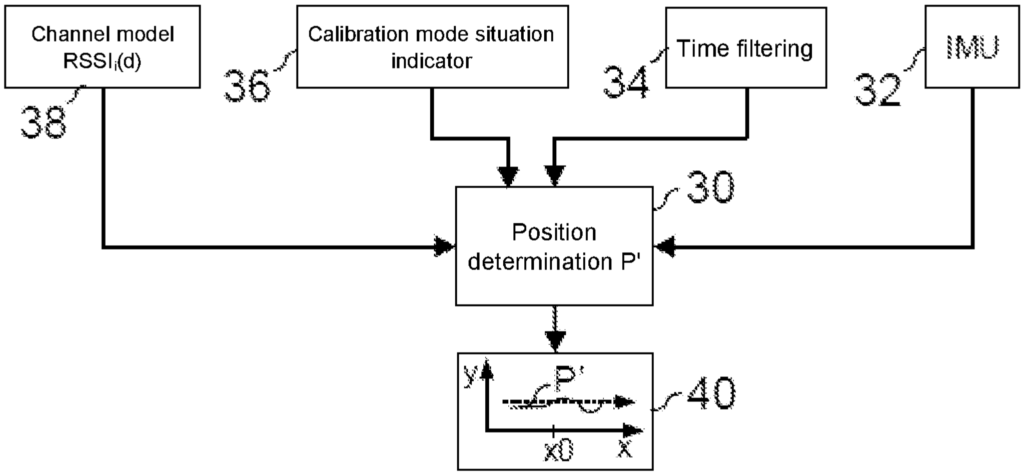
FIG. 3 is an exemplary representation of a model, including exemplary influencing factors, for determining a position of a user in the situation shown in FIG. 1.

FIG. 3 shows an exemplary basic illustration for determining a position of the user 4 in accordance with the situations shown in FIGS. 1 and 2. The position determination is based on a channel model (block 38). Depending on the configuration, the position can be determined using one of several calibration modes (block 36), wherein the calibration mode is able to be selected as a function of a situation indicator. This position determination can additionally be modified using time filtering (block 34) and/or sensor values (block 32). In one embodiment, the sensor values are generated by a sensor module (IMU, Inertial Measurement Unit) of the wireless device 2. The current position P' of the wireless device 2 (possibly modified by filtering and sensor values) results from the channel model adapted according to one of the calibration modes, which is indicated in FIG. 3 by a block 30. An exemplary position over time P' in the x-y plane (see FIG. 1) is indicated in a block 40. In block 40, the security gate 14 is located, for example, in the x direction at xo; it can also be seen from this that the position determination according to the technology described here extends over both zones 20, 22.

The technology described here is based on a concept that describes a loss of signal strength during transmission over a transmission channel. The transmission channel comprises the signal path from the wireless device 2 (including its antenna) over the air to one of the radio devices 6 (including its antenna), which can also contribute to the losses. Antenna losses and multipath propagation are considered random variables in the technology described here. It can be seen from FIGS. 1 and 2 that a plurality of signal paths start from or end at the wireless device 2. Such a concept is known to those skilled in the art as a channel model. According to the channel model used here, the average received signal strength indicator RSSI (d) (in dBm) as a function of the distance d is described by the following equation:

$$RSSI(d) = M(RSSI_{d_0}) - 10\alpha\log_{10}\left(\frac{d}{d_0}\right) + W,$$

$$\text{with } M(RSSI_{d_0}) = 10\log_{10}(P_{R,d_0})$$

$$\text{and } W = X + S + G = 10\log_{10}(x) + 10\log_{10}(s) + 10\log_{10}(g).$$

In this case:

$d_0$: Reference distance

α: Loss coefficient/loss exponent $M(RSSI_{d_0})$: mean received signal strength indicator RSSI at a reference distance do $P_{R,d_0}$: mean received power at a reference distance do X: Fading/fading variable, S: Radio shadowing variable, and G: Antenna gain/loss variable.

A momentary radio situation prevails in the monitoring area at a given point in time (here only the radio signals (Bluetooth technology) between the wireless device 2 and the radio devices 6 are considered, but not any other radio signals present in the building). Because each wireless device 2 also sends out at least one individual identifier with a radio signal, wireless devices 2 can be differentiated; this allows conclusions to be drawn about the number of active wireless devices 2 present in the monitoring area. The identifier can be a telephone number, an International Mobile Subscriber Identity (IMSI), a device ID (International Mobile Station Equipment Identity (IMEI)), a device address (Media Access Control (MAC) Address) or another type of unambiguous identification of a wireless device 2. The extent of radio shadowing by the users 4 present and the channel utilization can be estimated from the number of wireless devices 2. In addition, it may be possible to recognize, e.g. depending on the number of users 4, whether the user 4 in FIG. 2 is closer to the radio device $RF_1$ or the radio device $RF_2$ arranged opposite. In one embodiment, the type of wireless device 2 can also contribute to the radio situation. The device ID usually indicates the type of wireless device 2 it is (e.g. an iPhone from Apple or a so-called Android smartphone from another manufacturer).

The number of wireless devices 2 represents a situation indicator, as does the type of wireless device 2. Further situation indicators are an entry point of the user 4 into the monitoring area (e.g. the mentioned prominent place), sensor data generated by a wireless device 2, a user ID, a time, a number of radio devices 6, a (computer) computing power available in the access control system 1, a density of the radio devices 6 and a room size. From the evaluation of the radio communication in the monitoring area, at least one of these situation indicators can be determined, which indicates the radio situation in the monitoring area. The person skilled in the art recognizes that several of these situation indicators can be detected in order to display the radio situation, and that not all of the mentioned situation indicators can be determined in the access control system 1 at a certain time or for a certain wireless device 2.

According to the technology described here, the situation indicator is used to select a calibration mode that is appropriate to the situation and through which the channel model is adapted. Three different calibration modes, each with several possible calibration algorithms, are described below:

a reference wireless device-supported calibration mode, which is based on a dedicated calibration run with a reference wireless device 2*a* in a calibration phase and is described below in conjunction with FIG. 6;

a wireless device independent calibration mode based on a self-calibration approach in a calibration phase; and an automated real-time calibration mode that works with a reduced calibration or without a special calibration phase.

The parameters of the channel model mentioned, in particular the average received power ($P_{R,d0}$) in the reference distance do and the loss coefficient $\alpha$, can differ considerably for different radio situations and wireless devices 2. For a reliable position determination, however, the knowledge of these parameters is important for a given system and a given radio situation, in particular even if the propagation environment for the radio signals changes. With the mentioned calibration modes, the parameters can be determined with or without knowledge of the path of the user 4 in a calibration phase or a calibration phase can be omitted.

First, reference is made to the calibration mode that is independent of the wireless device, also referred to below as self-calibration. The loss coefficients ai, which describe path losses, are determined on the basis of measurements between the radio devices 6 and knowledge of the locations of the radio devices 6. In a calibration phase, each radio device 6 is used as an individual transmitter, while the remaining radio devices 6 are receivers. If a first radio device 6 radio transmits test signals to all other radio devices 6, the received signal strength indicators $RSSI_i$ determined by them are stored. The first radio device 6 that was previously transmitting then changes to a receiver mode and the next radio device 6 begins to transmit. This process is repeated until all radio devices 6 have sent radio test signals once. Based on the knowledge of all the locations of the radio devices 6 and thus also the distances between the radio devices 6, the received signal strength indicators $RSSI_i$ can be used to determine the corresponding loss coefficients ai for all radio devices 6. One advantage of self-calibration is that it can be automated without great effort and repeated if necessary, e.g. with changes in the environment. It can be used, for example, when the wireless device 2 is located in the vicinity of the radio devices 6 due to the building situation (e. g. a building door leads directly into the monitoring area) if its position is to be determined: this can, for example, be detected by the said radio fingerprinting in order to select the mode of self-calibration.

The automated real-time calibration mode has the advantage that it requires little or no prior knowledge and thus reduces the installation effort. In one embodiment, the automated real-time calibration mode manages without a special calibration phase. The position of the wireless device 2 is determined without any prior knowledge other than the locations of the radio devices 6. Instead of estimating the parameters of the channel model used for the position determination in a previous calibration phase, these parameters are viewed as interference parameters and are determined in real time together with the position of the wireless device 2. This approach eliminates the need for calibration, since the corresponding optimization does not depend on the reference RSSI values or the loss coefficients ai. As a result, the algorithm can adapt to new propagation environments or to an antenna pattern of the wireless device 2. In one embodiment, the accuracy can be improved if only the loss coefficients $\alpha_i$ are considered as interference parameters, but the mean received signal strength indicator $M(RSSI_{d_0})$ is known at the reference distance do. In one embodiment, the automated real-time calibration mode determines the trajectory of the movement from the start of the measurement to the current point in time.

In another embodiment, the real-time automated calibration mode is iterative: it is based on the assumption that the first position of the user 4 is known. As stated above, this can be the case if the user 4 comes directly into the monitoring area through a landing door or elevator door and moves on from this initial position. By means of a single determination of the received signal strength indicator $RSSI_i$ for each radio device 6, the loss coefficient ai can be determined for each radio device 6. The loss coefficients ai determined in this way are then used to determine the (new) position of the user 4. This new position determination is then used to determine new loss coefficients $\alpha_i$ for each radio device 6 on the basis of two received signal strength indicators $RSSI_i$. This process is then continued iteratively for the entire path.

In a further embodiment of the automated real-time calibration mode, the (old) data obtained through this iterative procedure can be used in an extension in order to initially achieve a certain minimum stability of the position determination. This algorithm is based on earlier but outdated information on the loss coefficients $\alpha$. While these lead to inaccurate position determinations, their accuracy is often superior to the initial positions determined by means of the iterative approach at the beginning of a run. For example, the first 10-30 measurements, in particular the first 20-25 measurements, can be used. This number of measurements is sufficient to obtain preliminary and stable positions for a correct estimation of the loss coefficients $\alpha$.

In one embodiment of the access control system 1, a calibration phase is provided which, for example, is carried out when the access control system 1 is put into operation on site. In this calibration phase, a reference constant (mean value $M(RSSI_{d0})$) and several loss coefficients ai can be determined. As an alternative to calibration during commissioning on site, the calibration, in particular with regard to the reference constant $M(RSSI_{d0})$, can be carried out centrally if the radio devices 6 are structurally identical and have substantially identical radio properties, for example at the manufacturer or supplier of the access control system 1. If necessary, the calibration phase can be repeated after commissioning.

The calibration mode based on the reference wireless device 2*a* is explained below. In this case, the reference wireless device 2*a* is guided in the calibration phase along an established path (and thus known position information) and received signal strength indicators $RSSI_i$ are measured and stored together with the known position information. It is not necessary that the exact distance is known, it is sufficient that it is roughly established, with a beginning, an end, and a constant speed between the beginning and the end. In one embodiment, this approach is expanded in that the path is divided into individual path segments (k) in order to determine different loss coefficients ai for the path loss for each radio device 6 and each path segment (k). For a user 4 whose position is to be determined, the algorithm selects the path segment (k) in which the user 4 could be (determined by means of radio fingerprinting), and consequently assigns to each radio device 6 the corresponding loss coefficient ai for this path segment (k). Further explanations are given in connection with FIG. 5.

Figure 4:
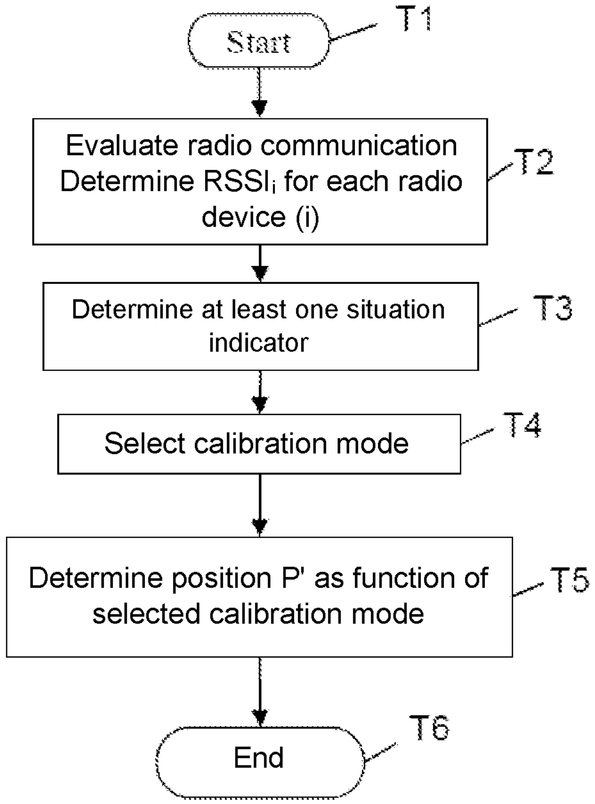
FIG. 4 is a flowchart of an embodiment of a method for operating an access control system.

FIG. 4 shows a flowchart of an embodiment of a method for operating the access control system 1, wherein the position of the user 4 is determined in an application phase. For a flowchart shown in this application by means of individual steps, it generally applies that the division into the steps shown is exemplary and that in another illustration one or more of these steps can be divided into one or more sub-steps or several of the steps can be combined into one step. The selected illustration of a flow chart is therefore not to be understood as a restriction.

The user 4 is located, as shown by way of example in FIGS. 1 and 2, with the wireless device 2 in the vicinity of the security gate 14. Although only the user 4 is shown, those skilled in the art will recognize that other users and wireless devices may be present. The Bluetooth function of the wireless device 2 and any associated software application are activated, and a calibration phase is completed. The storage device 18 is configured for the technology described here: in particular, it stores building data (e.g., building or floor plans) and processing instructions for the mentioned situation-specific calibration modes. The processing instructions include algorithms for the various calibration modes, algorithms for position determination, data determined in a calibration phase (e.g., reference distance do, reference radio signal pattern, reference received signal strength indicators). The person skilled in the art recognizes that the storage device 18 also stores data (online) determined in the application phase.

The user 4 moves, for example, along the path 26 from the public zone 22 in the direction of the restricted-access zone 20. It is assumed here that the wireless device 2 is already within radio range of the radio devices 6 ($RF_1$-$RF_4$). The method begins with a step T1 and ends with a step T6.

In a step T2, radio communication in the monitoring area is evaluated by the signal processing device 8. For the technology described here, this radio communication represents the entirety of the radio signals transmitted and considered in the monitoring area (Bluetooth technology). These include, for example, radio signals that transmit the aforementioned advertising events and radio signals that respond to them. The signal processing device 8 determines from this, for example, the identifiers of the wireless devices 2 present.

The signal processing device 8 also detects the signal strength with which the radio signals are received by the radio devices 6 and/or the wireless devices 2 present. In one embodiment, a received signal strength indicator $RSSI_i$ based on a radio communication with a wireless device 2 is detected by the signal processing device 8 for each radio device 6.

In a step T3, the signal processing device 8 determines at least one situation indicator which indicates a radio situation prevailing in the monitoring area. The situation indicator is determined based on the evaluation carried out in step T2. Exemplary situation indicators are mentioned above.

In a step T4, at least one calibration mode assigned to the situation indicator is selected. For this purpose, at least one rule is defined in the access control system 1, in particular in a computer program and/or a processor of the signal processing device 8. Those skilled in the art will recognize that several rules can be established. Examples of such a rule are given below:

- If, for example, the situation indicators show the type of wireless device 2 and the point of entry into the monitoring room, a check is made as to whether a calibration data set (processing instructions) for the reference wireless device-supported calibration mode is available in the memory device 18. This calibration mode can be selected in particular if the entry point is the starting point of a calibration run.
- If the situation indicators show a user identifier and the time in addition or as an alternative to the situation indicators mentioned in the preceding rule, a check is made as to whether a position determination according to a calibration mode has already taken place for this user 4 for a similar time. If this is the case, this calibration mode can be selected again.
- If the situation indicators show the number of users 4 in the monitoring area, and if this number is significantly higher than the number that was present during a calibration run, then, for example, the wireless device independent calibration mode (self-calibration) or the automated real-time calibration mode are available.
- If there is no calibration data set that appears to be suitable for a special calibration mode for a radio situation indicated by the situation indicators, then, for example, the wireless device independent calibration mode (self-calibration) or the automated real-time calibration mode are available. But if, for example, a situation indicator shows the time and it is known that this corresponds to a rush hour with many users 4 present, self-calibration can be selected because it can adapt to changed environmental conditions.
- Depending on the situation in the building, the access control system 1 or its computer system can be used to a greater or lesser extent or have less or more computing power available. If the available computing power is used as a situation indicator, for example, the more computation-intensive automated real-time calibration mode can be selected if the computer system has sufficient computing power available.

Those skilled in the art will recognize that other and/or additional rules can be established.

If the calibration mode is selected, the signal processing device 8 reads the processing instructions assigned to this calibration mode from the data storage device 18.

In a step T5, the position P' of the first wireless device 2 is determined in accordance with the processing instructions that have been read. The position' is determined according to an embodiment as described in connection with FIG. 7. In conjunction with FIG. 7, an embodiment for using the determined position P' is also given. The method ends in step T6.

Figure 5:
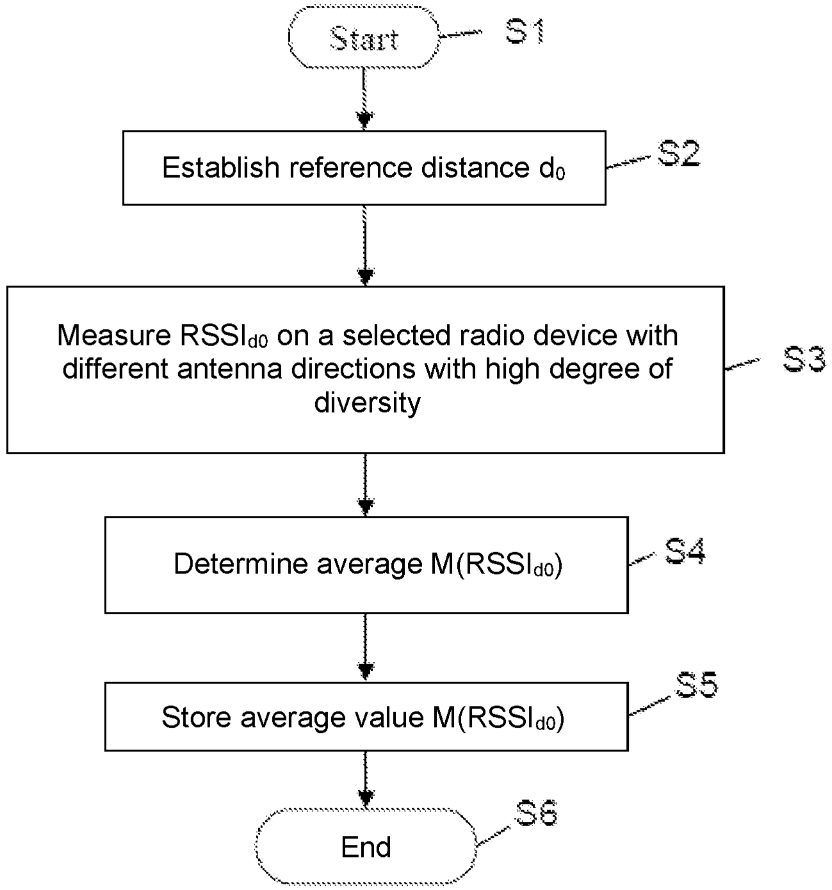
FIG. 5 is a flowchart of an embodiment of a calibration method for determining a reference constant.

FIG. 5 shows a flow chart of an embodiment of a calibration method for determining an average value of the reference constant $RSSI_{d_0}$; this mean value of the reference constant is designated as $M(RSSI_{d_0})$. The calibration method is described with reference to the situations shown in FIGS. 1 and 2, wherein the reference wireless device 2*a* is used in the calibration phase (this can be identical to the wireless device 2). The method begins with a step S1 and ends with a step S6.

A reference distance do is established in a step S2. The reference distance do is the distance between the reference wireless device 2*a* and a selected radio device 6 (in FIG. 1 this is the radio device 6 designated as $RF_1$). The reference distance do is preferably equal to or less than 1 m; in one embodiment, $d_0$=1 m. If the reference distance do is selected, the reference wireless device 2*a* is positioned at this distance from the selected radio device 6.

If the reference wireless device 2*a* and the selected radio device 6 are switched on so that they are in radio communication according to the BLE technology, a large number of received signal strength indicators $RSSI_{d0}$ are determined in a step S3. In one embodiment, each received signal strength indicator $RSSI_{d0}$ is measured in relation to the radio signal arriving at the radio device 6. With the reference distance do unchanged, the reference wireless device 2*a* is rotated or moved around the selected radio device 6. An antenna of the reference wireless device 2*a* thus assumes different antenna orientations in relation to the selected radio device 6 (angular diversity). In addition, this results in a high (spatial) diversity. After each change in the antenna alignment, at least one received signal strength indicator $RSSI_{d0}$ is determined and stored in the memory device 18. The number of measurements and the number of antenna alignments changed can be specified in a calibration specification.

If the specified measurements have been carried out in step S3, the mean value of the received signal strength indicators measured and stored in step S3 is determined in step S4 $RSSI_{d0}$ (in dBm). This mean value $M(RSSI_{d0})$ of the reference constant $RSSI_{d0}$ is stored in a step S5 in the memory device 18 and is available for a position determination in an application phase. The reference wireless device 2*a* and the selected radio device 6 can then be deactivated and the method ends in step S6.

Figure 6:
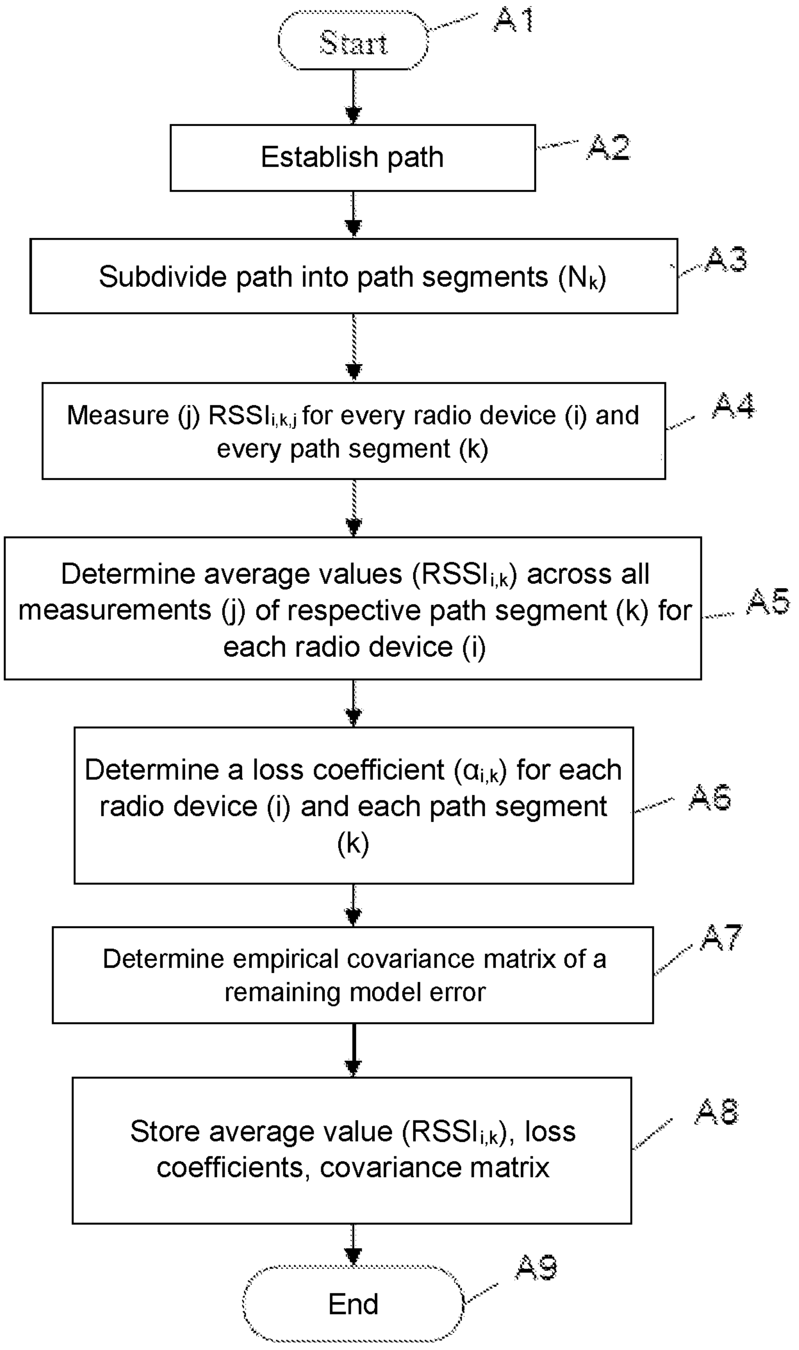
FIG. 6 is a flowchart of an embodiment of a calibration method for determining a loss coefficient.

FIG. 6 shows a flow chart of an embodiment of a calibration method for determining the loss coefficients α. The calibration method is also described with reference to the situations shown in FIGS. 1 and 2 and the reference wireless device 2*a*. The method begins with a step A1 and ends with a step A9.

In this calibration method, a large number of measurements of the received signal strength (RSSI measurements) are carried out while the reference wireless device 2*a* is moved along an established path in the building. For this purpose, the path for the given situation in the building is established in a step A2. For the calibration, for example, the path 26 shown in FIG. 1 can be selected.

In a step A3, the path 26 is divided into a number (Nk) of path segments. The person skilled in the art recognizes that this is a division intended for calibration. Depending on the path and the building situation, the path segments can be the same or different lengths. After this division, the path 26 has a first path segment (k=1), a second path segment (k=2), generally a k-th path segment. In the following, the index k indicates for which of these path segments an RSSI measured value was determined.

The switched-on reference wireless device 2*a* is initially located at the beginning of the path 26 and is moved from there at a constant speed along the path 26. If the reference wireless device 2*a* is in one of the path segments (index k), the received signal strength indicator $RSSI_{i,k}$ is determined in a step A4 for each radio device 6 (index i) and stored, namely as often (index j, number of measurements per path segment) until the reference wireless device 2*a* reaches the end of the current path segment. At the end of the current path segment, the reference wireless device 2*a* sends a segment signal according to an embodiment. The signaling of the end of a path segment ensures that the RSSI measured values can be correctly assigned, processed and saved. If, for example, for each radio device 6 (index i) and within a path segment (index k) the received signal strength indicator is determined $N_{j,k}$ times (index j), the result is the set of measured values to $\{RSSI_{i,k,j}\}$, which is stored in the memory device 18. If the end of the path 26 has not yet been reached, the next path segment follows, and the measurement process described is repeated.

In a step A5, an average of the $RSSI_{i,k}$ measured values is formed over all measurements (index j) of a respective path segment (index k) for each individual radio device 6 (index i). This mean value is referred to below as $M(RSSI_{i,k})$. Its determination is based on:

$$M(RSSI_{i,k}) = \frac{1}{N_{j,k}} \sum_{j=1}^{N_{j,k}} RSSI_{i,k,j},$$

where j=1, . . . , $N_{j,k}$ denotes the j-th measurement in the corresponding k-th path segment for the i-th radio device 6.

In a step A6, a loss coefficient $\alpha_{i,k}$ is determined for each radio device 6 and each path segment using the mean values $M(RSSI_{i,k})$ determined in step A5. The determination is made according to:

$$\alpha_{i,k} = \frac{\Sigma_{j=1}^{N_{j,k}} \log_{10}\left(\frac{d_{i,k,j}}{d_0}\right)\left(M(RSSI_{d_0}) - RSSI_{i,k,j}\right)}{10\,\Sigma_{j=1}^{N_{j,k}} \log_{10}^2\left(\frac{d_{i,k,j}}{d_0}\right)},$$

where j=1, . . . , $N_{j,k}$ denotes the j-th measurement in the corresponding k-th path segment for the i-th radio device 6. With known locations of the radio devices 6, this results in the distance $d_{i,k,j}$ to the wireless device 2*a* for each radio device 6 (for the tuple (i,k,j)).

In a step A7, an empirical covariance matrix 2'*w* is determined over the entire path 26. The values $$\sigma_i^2$$

of the main diagonals of this matrix are saved. These diagonal elements are a measure of the different model error variance of the individual radio devices 6. The covariance matrix $\Sigma'_w$ refers to the remaining model error $\varepsilon_{k,j}$.

$$\varepsilon_{i,k,j} = RSSI_{i,k,j} - M(RSSI_{d_0}) + 10\alpha_{i,k}\log_{10}\left(\frac{d_{i,k,j}}{d_0}\right)$$

$$\varepsilon_{k,j} = \begin{bmatrix} \varepsilon_{1,k,j} \\ \vdots \\ \varepsilon_{N_A,k,j} \end{bmatrix}$$

$$\mu' = \frac{1}{N_K} \sum_{k=1}^{N_K} \left( \frac{1}{N_{j,k}} \sum_{j=1}^{N_{j,k}} \varepsilon_{k,j} \right)$$

$$\Sigma'_W = \frac{1}{N_K} \sum_{k=1}^{N_K} \left( \frac{1}{N_{j,k}} \sum_{j=1}^{N_{j,k}} (\varepsilon_{k,j} - \mu')(\varepsilon_{k,j} - \mu')^T \right).$$

In a step A8, the mean values $M(RSSI_{i,k})$, the loss coefficients $\alpha_{ik}$ and the covariance matrix $\Sigma'_w$ are saved. They are then available for a position determination in the application phase. The reference wireless device 2*a* and the selected radio device 6 can then be deactivated and the method ends in step S6.

In one embodiment of the technology described here, the information obtained and stored in the calibration phase is used in the application phase in order to determine a current position P' of the user 4. Since the user 4 moves in the building, his movement can be followed if the position determination is repeated at successive time intervals. The positions P' determined in this way result in the named trajectory (position path). The time intervals can be selected as required.

Figure 7:
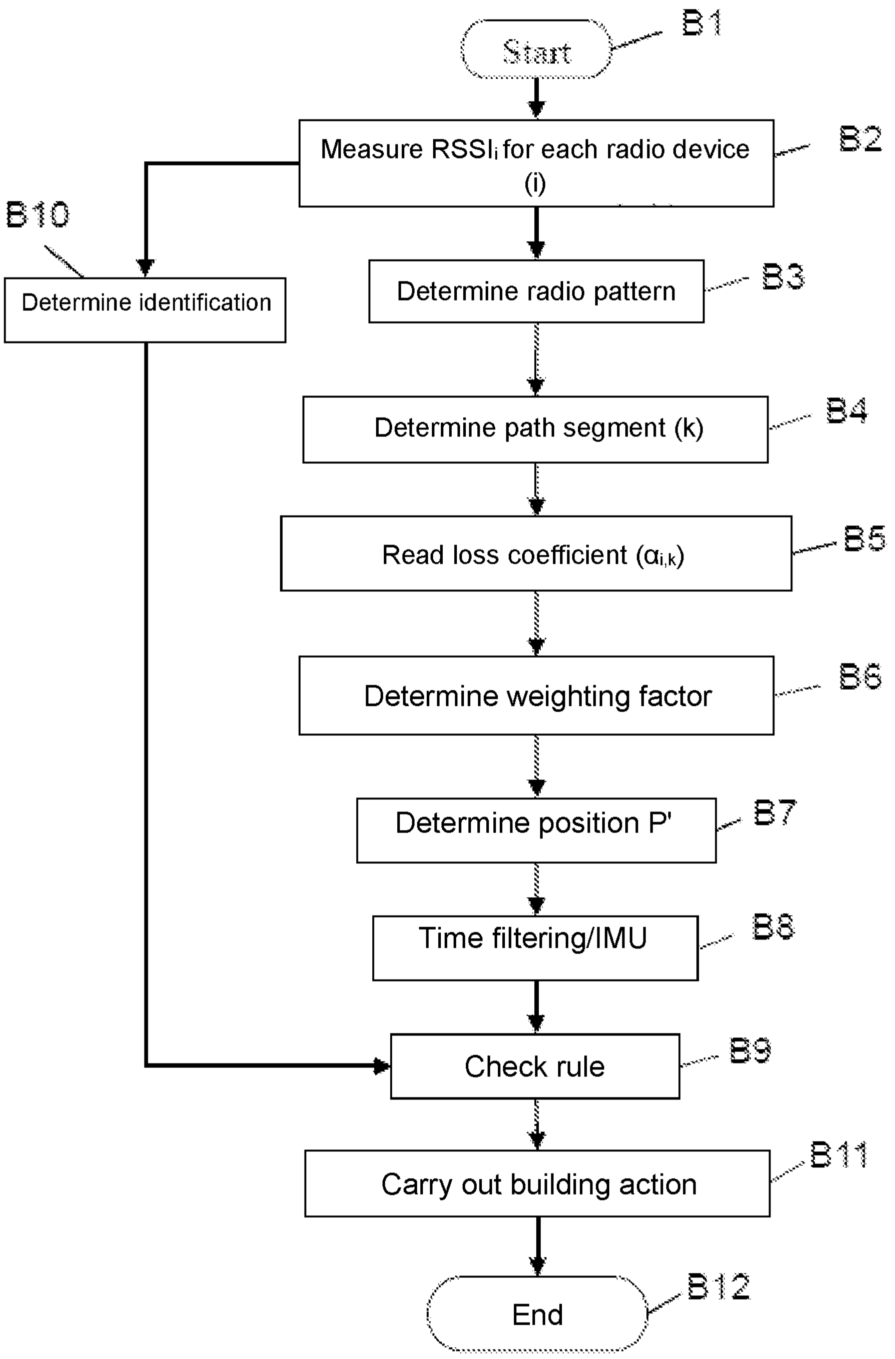
FIG. 7 is a flowchart of a further embodiment of a method for operating an access control system.

FIG. 7 shows a flow diagram of an embodiment of a method for operating the access control system 1, wherein the position P' (or a plurality of positions) of the user 4 is determined in the application phase. The user 4 is with the wireless device 2 in the vicinity of the security gate 14, wherein the Bluetooth function of the wireless device 2 is activated. Any associated software application is also activated. The user 4 moves, for example, along the path 26 from the public zone 22 into the restricted-access zone 20. It is assumed here that the wireless device 2 is already within radio range of the radio devices 6 ($RF_1$-$RF_4$). In the embodiment described here, the wireless device 2 transmits the attention notice referred to as an advertising event as a radio signal, and all radio devices 6 within radio range receive this radio signal. The method begins with a step B1 and ends with a step B12.

If the wireless device 2 communicates with one of the radio devices 6, the wireless device 2 also transmits a specific identifier. In FIG. 7, this identifier is determined in a step B10. The identifier can be a telephone number, a device address (Media Access Control (MAC) address) or another identifier which uniquely identifies the wireless device 2. Since a wireless device 2 is generally permanently assigned to a user 4, the identifier of the wireless device 2 is also indirectly assigned to the user 4. The access control system 1 stores the identifiers of the wireless devices 2 assigned to the authorized users 4, for example in the memory device 18 in which a user profile is created for each user 4. The name of the user 4 and his access authorizations can be specified in the user profile, for example which rooms 24 he has access to. It can also be specified on which days and at which times of the day the access authorization exists. In one embodiment, the determined identifier is stored in the storage device 18. In the memory device 18, for example, values measured and/or calculated for this user 4 can be unambiguously assigned to the identifier In a step B2, a received signal strength indicator $RSSI_i$ is determined for each of the radio devices 6. In the embodiment described here, the received signal strength indicators $RSSI_i$ are determined by the radio devices 6, wherein the determination is carried out synchronously, i.e. the radio devices 6 have a common time reference (e.g. identical clocks that allow the received signal strength indicators $RSSI_i$ to be determined simultaneously). The wireless device 2 is located at a current position, so that for the current position, for example, four received signal strength indicators $RSSI_i$ (i=1, 2, 3, 4) are present. With each subsequent measurement, four received signal strength indicators RSSI are measured again. The received signal strength indicators $RSSI_i$ are stored in one embodiment in the memory device 18, for example, per measurement a group of four received signal strength indicators $RSSI_i$.

A current radio pattern (FP in FIG. 2) is determined in a step B3. Such a radio pattern (also referred to as radio fingerprint) results from the entirety of the received signal strength indicators $RSSI_i$ determined by the radio devices 6 in step B2 while the wireless device 2 is at a certain location. That is, if the wireless device 2 is at the specific location, there are four received signal strength indicators $RSSI_i$ which represent the radio fingerprint for this location.

In a step B4, a path segment (k) is determined, specifically the path segment (k) in which the user 4 is currently located. For this purpose, the current radio fingerprint determined in step B3 is used to search the memory device 18 for the same or at least a very similar radio fingerprint. As explained in connection with steps A4 and A5 of FIG. 6, each radio device 6 is assigned an average value ($M(RSSI_{i,k,j})$) of the received signal strength indicators $RSSI_{i,k,j}$ measured for a specific path segment (k), which is stored in the storage device 18. If the current radio fingerprint (or its received signal strength indicators) coincides to a certain extent with the radio fingerprint stored for a path segment (k) (or its averaged received signal strength indicators ($M(RSSI_{i,k,j})$)), this results in the path segment (k) in which the user 4 is currently located. Exact matching is not required: the process searches for the stored radio fingerprint that is most similar to the current radio fingerprint.

In a step B5, the loss coefficients $\alpha_{i,k}$ are read which are assigned to the path segment (k) determined in step B4. The loss coefficients $\alpha_{i,k}$ are stored in the memory device 18, as set out in conjunction with step A8 of FIG. 6. Reading thus takes place in that the memory device 18 is searched for the loss coefficients $\alpha_{i,k}$ assigned to it by means of the determined path segment (k). A loss coefficient $\alpha_{i,k}$ is specific for each path segment (k) and specific for each of the radio devices 6.

In a step B6, a weighting factor $w_i$ is determined. The weighting factor w specifies what influence the measurement of a received signal strength indicator $RSSI_i$ relative to an i-th radio device 6 has on the position determination. In one embodiment, only the strongest radio signals, i.e., those having the highest received signal strength indicators $RSSI_i$, are taken into account. For example, the three (or four) highest received signal strength indicators $RSSI_i$ can be selected: i.e., for these three (or four) radio signals the weighting factor is $w_j$ $w_i$=1 in each case, $w_i$=0 for the remaining radio signals. In general, the weighting factor $w_i$ can be determined by the following equation:

$$w_i = \frac{\alpha_i^2}{\sigma_i^2},$$

$$\text{with } \sigma_i^2 = \Sigma'_{W,(i,i)}$$

In a step B7, the current position P' is determined by the user. The current position P' is a vector and indicates the x-y position coordinates at a specific point in time. The instantaneous position P' determined in this way can be the same as the actual position P of the user 4, but it can also deviate therefrom to a certain extent, especially under real conditions in the building. The determination is made according to the following equation:

$$P' = \underset{p}{\operatorname{argmin}} \sum_{i=1}^{N_A} w_i (\log d_i(p) - \log d_i')^2,$$

wherein:

$N_A$: Number of radio devices 6, $d'_i$: estimated distance between the wireless device 2 and an i-th radio device 6, and p: an optimization variable, $d_i(p)$: Euclidean distance between p and i-th radio equipment.

The corresponding distance calculated from the measured values d'i results in:

$$d_i' = d_0 10^{\frac{M\left(RSSI_{d_0}\right) - RSSI_i}{10\alpha}},$$

where $RSSI_i$ is a current measured value at the i-th radio device 6.

The position P' corresponds to a snapshot while the user 4 is moving along the path 26. The person skilled in the art will recognize that from the repeated determination of positions P' the movement of the user 4 can be tracked. This can be shown graphically, for example, as shown in box 40 in FIG. 3.

In one embodiment, the position determined in step B7 P' can be further processed. This further processing can include temporal filtering, as shown in box 34 of FIG. 3, consideration of sensor values, as shown in box 32 of FIG. 3, or a combination of these. This is shown in a step B8 in FIG. 7.

According to one embodiment, time filtering can be carried out because a large number of successive position determinations are carried out. Accordingly, a large number of positions P' are determined, including outliers, i.e. positions that deviate too much from neighboring values can be located. The influence of these outliers can be reduced by filtering them over time. In one embodiment, a mean value is determined over five specific positions P'.

In one embodiment, a Kalman filter, in particular a so-called extended Kalman filter (EKF), can be used. Kalman Filters and Advanced Kalman Filters are known to those skilled in the art, e.g. from I. Guvenc, et al., "Enhancements to RSS Based Indoor Tracking Systems Using Kalman Filters", International Signal Processing Conference (ESPC) and Global Signal Processing Expo (GPSx), 2003. A Kalman filter is generally used to reduce errors in real measured values and to provide estimates for non-measurable system variables. The prerequisite for this is that the values of interest can be described by a mathematical model, for example in the form of equations of motion. Kalman filters work with alternating prediction and measurement steps, which require a state space vector x, a vector state update function f and an observation space vector z or a vector measurement function h.

The state of a system is often understood to be the smallest set of determinants that fully describes the system. This is represented as part of the modeling in the form of a multi-dimensional vector x with the corresponding equation of motion f, the so-called equation of state. This vector function $f_m$ describes the expected transitions between temporally successive states ($x_{m-1}$ and $x_m$) at each point in time m, assumed according to the motion model. The process of observations $z_m$ of the true system status reflects the properties of the observer or the measuring apparatus. These are linked with the system states expected according to the equation of motion via the so-called observation equation $h_m$. The corresponding modeling of the status and observation processes is given below.

The state space vectors $x_{m-1}$. $x_m$ should be determined as precisely as possible. At a given point in time (m), these contain the successive positions P of the user 4, his absolute speed (||v||) and his orientation (θ). If these are estimated, it is predicted how this state space vector could look in the next time step (e.g. from time m-1 to time m) (predicted state space vector $$x_m^{pred}).$$

The vector function $f_m(x_{m-1})$ is used. In one embodiment, the vector function $f_m$ is selected in each time step in such a way that it can be assumed that the user 4 is moving at a constant speed and with the same orientation.

In a next step, the predicted state space vector $$x_m^{pred},$$

which so far has only been based on the last state and the transition function, can be improved by using current measurements. Two different embodiments can be used for this (the two embodiments differ in the vectorial measurement functions $h_m$ and the corresponding observation space vectors or measurement vectors $z_m$).

In the first embodiment (tri), the position determinations (positions P') from the previous position determination method are used as a measurement. The predicted state space vector $$x_m^{pred}$$

is corrected with these position determinations. Hence it follows:

$$x_{m-1} = \begin{bmatrix} P_{m-1} \\ \|v_{m-1}\| \\ \theta_{m-1} \end{bmatrix}, z_{m,tri} = P'_m,$$

$$x_m^{pred} = \begin{bmatrix} P_m^{pred} \\ \|v_m\|^{pred} \\ \theta_m^{pred} \end{bmatrix} = f_m(x_{m-1}) = \begin{bmatrix} P_{m-1} + v_{m-1}\Delta t \\ \|v_{m-1}\| \\ \theta_{m-1} \end{bmatrix},$$

$$e_{m,tri}^{pred} = h_{m,tri}(x_m^{pred}) = P_m^{pred}.$$

In the second embodiment, via the vectorial measuring function $h_{m,dir}$ ((which the channel model is based on), it is calculated which RSSI values can be expected if the user 4 is really in a state defined by one of the predicted state space vectors $$x_m^{pred}.$$

These expected RSSI values are then corrected directly ("dir" in the following equations) with the measured RSSI values. Hence it follows:

$$x_{m-1} = \begin{bmatrix} P_{m-1} \\ \|v_{m-1}\| \\ \theta_{m-1} \end{bmatrix}, z_m, dir = \begin{bmatrix} RSSI_{1,m} \\ \vdots \\ RSSI_{N_A,m} \end{bmatrix},$$

$$x_m^{pred} = \begin{bmatrix} P_m^{pred} \\ \|v_m\|^{pred} \\ \theta_m^{pred} \end{bmatrix} = f_m(x_{m-1}) = \begin{bmatrix} P_{m-1} + v_{m-1}\Delta t \\ \|v_{m-1}\| \\ \theta_{m-1} \end{bmatrix}$$

$$z_{m,dir}^{pred} = h_{m,dir}(x_m^{pred}) = \begin{bmatrix} M(RSSI_{d_0}) - 10\alpha_1 \log_{10}\left(\frac{d_1(P_m^{pred})}{d_0}\right) \\ \vdots \\ M(RSSI_{d_0}) - 10\alpha_{N_A} \log_{10}\left(\frac{d_{N_A}(P_m^{pred})}{d_0}\right) \end{bmatrix}.$$

In one embodiment, the method takes sensor values into account when determining the position. In this embodiment, the wireless device 2 contains an inertial measurement unit (IMU). If the wireless device 2 is configured as a so-called smartphone, it usually contains an IMU measuring unit. The IMU measuring unit is a spatial combination of several inertial sensors, e.g. B. acceleration sensors, magnetometers, pedometers and yaw rate sensors. In the case of a smartphone, the IMU measuring unit detects e.g. its inclination, position and/or rotation. This is known, for example, by a compass function of the smartphone or a function that rotates the screen display, depending on how the smartphone is held by the user 4.

With the IMU measuring unit, the wireless device 2 determines, for example, the direction of movement of the user 4 and the acceleration that it experiences when the user 4 walks along the path 26. The steps of the user 4 can be counted from the acceleration values. In one embodiment, the known dead reckoning method is used to determine the speed of movement of the user 4 from the direction of movement and the steps counted. The dead reckoning allows the current approximate location of a moving object based on the direction of movement and speed. In one embodiment (wireless device 2 sends the advertising event packets), the signal processing device 8 receives the measured values from the IMU measuring unit. After the measurement, the IMU data were transmitted to the signal processing device 8 together with the RSSI measurements.

By adding the movement speed of the user 4 and the IMU compass angle to the observation spaces and the measuring function of the filter, the sensor data are merged with the position and the received signal strength indicator RSSI. As a result, in particular the change in the movement of the user 4 over time can be better followed. If the user 4 changes, for example, the direction of movement, this can be recognized earlier so that, for example, the release of the security gate 14 can be omitted.

In a step B9 it is checked whether a rule defined in the access control system 1 is satisfied. To check the rule, the identifier determined in step B10 is used to check whether a user profile exists for user 4. If there is a user profile, the user 4 is known in the access control system 1 and it can be checked whether he is authorized to access at this point in time. If, on the other hand, the identifier is not stored in the access control system 1, there is no access authorization for the user 4.

As a rule, it can be specified, for example, that the security gate 14 is to be released when the user 4 is authorized to access. If it is a barrier-free security gate, the rule can state that no measures (e.g. alarm) need to be taken. If, on the other hand, the user 4 is not authorized to access, the rule can stipulate that the security gate 14 remains blocked and/or a security measure is to be initiated (e.g. notification of security personnel). Depending on the building, the rule can also stipulate that a building action specified in his user profile is to be carried out for the (access-authorized) user 4. The building action may, for example, involve triggering a destination call for user 4 (according to the data of the user profile existing for this user 4), assigning an elevator 10 to this destination call and displaying the assigned elevator to the user 4 at the security gate 14 or the wireless device 2. In a step B11, the building action is carried out. The person skilled in the art will recognize that several building actions can also be carried out in combination, e.g. unlocking the security gate 14 and triggering an elevator call. The method ends in step B12.

In one embodiment, a plausibility check can be provided in the method. Such a check is intended to identify whether a position that has been determined can be plausible at all, i.e., any obvious inaccuracy that may be present is to be recognized. An obvious inaccuracy can consist, for example, in the fact that the determined position is outside the monitoring area or that two users are in the same position and are therefore supposedly standing on top of each other. In response to this, the position determined can be viewed as an outlier and rejected.

Figure 8:
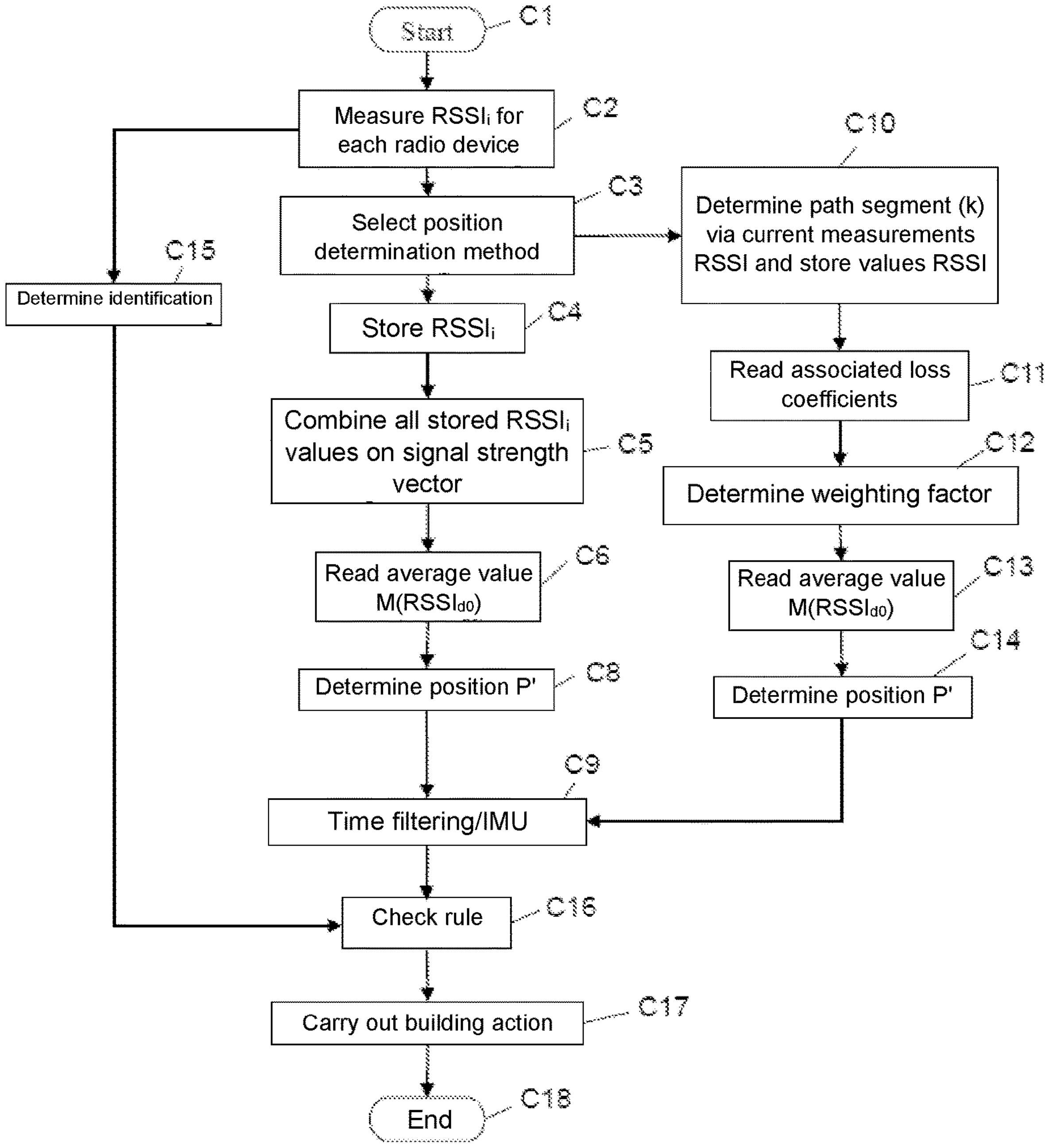
FIG. 8 is a flowchart of an additional embodiment of a method for operating an access control system.

FIG. 8 shows a flowchart of an additional embodiment of a method for operating an access control system, which begins in a step C1 and ends in a step C18. It can be seen in particular that, after the calibration mode has been selected in a step C3, the method is divided into two method branches. A first branch of the method (steps C4-C8) determines the position of a user 4 according to the automated real-time calibration mode, and a second branch of the method (steps C10-C14) determines the position of the user 4 according to the calibration mode based on the reference wireless device, which is based on a calibration run with a reference wireless device 2*a* in a calibration phase. The reference wireless device-supported calibration mode is described in connection with FIGS. 6 and 7, wherein the steps B3-B7 shown in FIG. 7 essentially correspond to the steps C10-C14 shown in FIG. 8, so that they are not redescribed at this point. This also applies to step C15, which corresponds to step B10, step C2, which corresponds to step B2, and steps C9, C16, and C17, which correspond to steps B8, B9 and B11, respectively.

In the first branch of the method (steps C4-C8), the calibration mode is selected in step C3. The selection is made analogously to the selection disclosed in step T4 of FIG. 4, based on at least one situation indicator which indicates the radio situation in the monitoring area.

If the automated real-time calibration mode is selected, the received signal strength indicators $RSSI_i$ determined in step C2 in relation to the user 4 are stored in a step C4. The storage takes place, for example, in the storage device 18.

In a step C5, all of the received signal strength indicators $RSSI_i$ stored in step C4 for the user 4 are combined to form a signal strength vector.

In a step C6, the mean value of the reference received signal strength indicators M(RSSIdo) determined in the calibration phase is read from the storage device 18.

In a step C8, the position of the user 4 is determined. With the indicators for the received signal field strengths $RSSI_i$ determined in steps C2 and C4-C6, the mean value of the reference received signal strength indicators $M(RSSI_{d_0})$ and the known locations of the radio devices 6, the position P' can be determined by means of a cost optimization function. The loss coefficients $\alpha_i$ are determined by means of a maximum likelihood estimation based on a previously possible position path. The maximum likelihood estimation is known to the person skilled in the art and in statistics refers to a parametric estimation method. To put it simply, that parameter is selected as the estimate, according to whose distribution the realization of the observed data appears most plausible. The resulting residual costs, according to a negative log likelihood function, are determined taking into account the determined loss coefficients ai as a function of the position path. The residual costs are then minimized via possible position paths. The minimization can be carried out by means of minimization algorithms which are known to the person skilled in the art, for example by means of the known Levenberg-Marquardt algorithm. For example, the software product MATLAB from The Math Works, Inc., USA, can be used to carry out the cost optimization function. The most current element of the position path found in this way is then used as the determined current position P'.

With the position of the user 4 determined in this way, the method can carry out the further steps C9, C16, and C17. The method ends in step C18.

In one embodiment, the signal processing device 8 is configured to use the technology described herein in conjunction with one or more machine learning algorithms, with the aim of determining the accuracy of the position determination or position tracking. A computer program installed in the signal processing device 8 is programmed to execute the corresponding algorithm or algorithms. Machine learning algorithms typically consist of a training phase and a deployment phase. When executing during the deployment phase, the computer program accesses one or more data records stored in the storage device 18 which were created in the training phase. Such a data record contains data on position determinations that have already taken place (e.g., situation indicators, received signal strength indicators $RSSI_i$), for example also whether a position determination or position tracking was successful. Whether a position tracking was successful can be verified afterwards, for example, if the user 4 who came in through a door A actually walks through a door B. In the application phase, currently determined data (radio situation, current received signal strength indicators $RSSI_i$) in conjunction with the data determined in the training phase are analyzed by the computer program in order to determine a function that maps the current position or its trajectory based on the currently determined data.

The wireless device 2 can have e.g. an application-specific software application (also referred to as an app) that can be activated by the user 4, for example. The application-specific software application is used in one embodiment in connection with the access control and with the use of elevators. In one embodiment, the application-specific software controls the generation and transmission of the radio signal. Depending on the configuration, this software can also generate the identifier of the wireless device 2, for example an identifier that is unique to the wireless device 2 and cannot be changed over time. Such an identifier generated by software is an alternative to a device identification number and a telephone number, which can also be used as an identifier.

The wireless device 2 may be, for example, a cell phone, a smartphone, a tablet PC or a smartwatch, wherein these devices usually are equipped with hardware that allows radio communication. However, the wireless device 2 may also be eyeglasses with a miniature computer or another body-worn, computer-aided device (also referred to as a "wearable device"), in particular a smartwatch. Depending on the design of the wireless device 2, it can have, for example, a graphical user interface (GUI) in order to be able to selectively activate and deactivate the wireless device 2 and its functions.

In summary, one aspect of the technology described herein relates to a system for controlling access to a restricted-access zone in a building, and another aspect relates to a method for controlling access to a restricted-access zone in a building. Further aspects of the technology described herein relate to a system and method for determining a position or a time profile of the position of a user, such as described in conjunction with FIG. 4 and FIG. 7. The determination of the position or its chronological sequence can take place and be claimed independently of the control of access to a restricted-access zone in a building. Additional aspects of the technology described here relate to a system and a method for calibrating parameters for position determination, as described, for example, in connection with FIGS. 5 and 6. This calibration can take place and be claimed independently of the access control and independently of the determination of the position or its course over time. In addition, one aspect of the technology described here relates to a system in which one or more algorithms for machine learning are used in order to automatically further develop the accuracy of the position determination or position tracking.

The invention claimed is:

1. System for controlling access to a restricted-access zone in a building in which a security gate separates the restricted-access zone from a public zone, comprising:

radio devices which are each arranged at respective locations at specified distances from the security gate and define a monitoring area, wherein the radio devices are configured for radio communication with wireless devices that are within radio range and assigned to users, wherein a first wireless device at a position (P) of a first user has a respective distance ($d_i$), to each of the respective radio devices;

a control device which is communicatively coupled to a building device, a data storage device in which processing instructions for situation-specific calibration modes are stored; and a signal processing device which is communicatively coupled to the data storage device, the radio devices, and the control device, wherein the signal processing device is configured to analyze the radio communication in the monitoring area and to determine at least one situation indicator therefrom, which indicates a radio situation prevailing in the monitoring area;

to acquire, for each radio device, a received signal field strength indicator ($RSSI_i$) based on a radio communication with the first wireless device;

to select the calibration mode assigned to the at least one situation indicator and to read the processing instructions assigned to the selected calibration mode from the data storage device; and to determine a current position (P') of the first wireless device as a function of the detected indicators for the received signal field strengths ($RSSI_i$) according to the processing instructions that have been read;

wherein an individual identifier of the first wireless device is also stored in the data storage device and the individual identifier is transmitted by the first wireless device;

wherein the signal processing device is configured to feed a control signal to the control device when based on the identifier and the determined current position (P') of the wireless device a defined rule is satisfied; and wherein the control device is configured to initiate a building action corresponding to the defined rule, in particular to release the security gate.

2. System according to claim 1, wherein the at least one situation indicator displays a type of wireless device, a number of wireless devices in the monitoring area, a spatial orientation of a wireless device, an entry point of the user into the monitoring area, sensor data generated from a wireless device, a time, a number of radio devices, an available computing power, a density of the radio devices or a room size.

3. System according to claim 1, wherein the data storage device also stores:

a radio signal strength reference value ($M(RSSI_{d0})$), which is determined from a radio communication between one of the radio devices and a reference wireless device arranged at a reference distance ($d_0$) in a calibration phase, a reference radio signal pattern (FP) as a function of a position of the reference wireless device, wherein the reference radio signal pattern (FP) is determined from the radio communication between the radio devices and the reference wireless device in a calibration phase, and a loss coefficient ($\alpha_i$) determined in the calibration phase for each of the radio devices ($RF_i$) as a function of the reference position of the reference wireless device.

4. System according to claim 3, wherein first processing instructions for a first calibration mode establish a position determination according to $$P' = \underset{p}{\operatorname{argmin}} \sum_{i=1}^{N_A} w_i (\log d_i(p) - \log d'_i)^2$$

wherein $w_i$ is a weighting factor, $N_A$ is a number of radio devices and $d_i(p)$ is a Euclidean distance between an i-th radio device and a variable position (p) of the user, wherein a distance determined by means of the reference radio signal pattern (FP) (d'i) between the wireless device and an i-th radio device results as follows:

$$d'_i = d_0 10^{\frac{M(RSSI_{d_0})-RSSI_i}{10\alpha}};$$

and wherein the loss coefficient ($\alpha_{ik}$) is defined according to $$\alpha_{i,k} = \frac{\Sigma_{j=1}^{N_{j,k}} \log_{10}\left(\frac{d_{i,k,j}}{d_0}\right)\left(M(RSSI_{d_0}) - RSSI_{i,k,j}\right)}{10\,\Sigma_{j=1}^{N_{j,k}} \log_{10}^2\left(\frac{d_{i,k,j}}{d_0}\right)}$$

where i=1 $N_{j,k}$ denotes the i-th measurement in a k-th path segment of a defined path for the i-th radio device, wherein the path segments are defined in a calibration phase.

5. System according to claim 3, wherein second processing instructions for a second calibration mode establish a determination of a trajectory of a movement of the user, wherein the determination is based on the established locations of the radio devices, the detected indicators for the received signal strengths ($RSSI_i$) and the radio signal strength reference value ($M(RSSI_{d_0})$), wherein loss coefficients ($\alpha_i$) are determined by means of a maximum likelihood estimate, wherein residual costs are determined according to a negative log-likelihood function, taking into account the determined loss coefficients ($\alpha_i$) and wherein the residual costs are minimized over the position path.

6. System according to claim 1, wherein the radio devices and the wireless devices are configured for radio communication according to Bluetooth technology.

7. Method for operating a system for controlling access to a restricted-access zone in a building, in which a security gate separates the restricted-access zone from a public zone, wherein the system includes: radio devices which are each arranged at respective locations at specified distances from the security gate and define a monitoring area, wherein the radio devices are configured for radio communication with wireless devices that are within radio range and assigned to users, wherein a first wireless device has a respective distance ($d_i$) at a first position (P) of a first user to each of the respective radio devices, a control device which is communicatively coupled to a building device, a data storage device in which processing instructions for situation-specific calibration modes are stored, and a signal processing device which is communicatively coupled to the data storage device, the radio devices and the control device, wherein the method comprises:

analyzing radio communications in the monitoring area and, based on the analysis, determination of a situation indicator which indicates a radio situation prevailing there;

detecting for each radio device a received signal field strength indicator ($RSSI_i$) based on a radio communication with the first wireless device;

selecting a calibration mode assigned to the situation indicator and reading the processing instructions assigned to it from the data storage device; and determining a current position (P') of the first wireless device as a function of the detected indicators for the received signal field strengths ($RSSI_i$) according to the processing instructions that have been read;

storing an individual identifier of the first wireless device in the data storage device, and transmitting the individual identifier by the first wireless device during radio communication with a radio device;

generating, by the signal processing device, a control signal for the control device when based on the identifier and the determined current position (P') of the wireless device a defined rule is satisfied; and initiating, by the control device, a building action corresponding to the defined rule, in particular a release of the security gate.

8. Method according to claim 7, wherein the situation indicator indicates a type of wireless device, a number of wireless devices in the monitoring area, a spatial orientation of a wireless device, an entry point of the user into the monitoring area, sensor data generated by a wireless device, a time, a number of radio devices, an available computing power, a density of the radio devices or a room size.

9. Method according to claim 7, wherein the data storage device also stores:

a radio signal strength reference value ($M(RSSI_{d0})$) which is determined from a radio communication between one of the radio devices and a reference wireless device arranged at a reference distance ($d_0$), a reference radio signal pattern (FP) as a function of a position of the reference wireless device, wherein the reference radio signal pattern (FP) is determined from the radio communication between the radio devices and the reference wireless device, and a loss coefficient ($\alpha_i$) determined in the calibration phase for each of the radio devices ($RF_i$) as a function of the reference position of the reference wireless device.

10. Method according to claim 9, wherein a position determination according to first processing instructions for a first calibration mode takes place according to $$P' = \underset{p}{\operatorname{argmin}} \sum_{i=1}^{N_A} w_i (\log d_i(p) - \log d'_i)^2$$

where $w_i$ is a weighting factor, $N_A$ is a number of radio devices and $d_i(p)$ is a Euclidean distance between an i-th radio device and a variable position (p) of the user, wherein a distance ($d'_i$) between the wireless device and an i-th radio device determined by means of the reference radio signal pattern (FP) results as follows:

$$d_i' = d_0 10^{\frac{M(RSSI_{d_0}) - RSSI_i}{10\alpha}}.$$

11. Method according to claim 9, wherein the loss coefficient ($\alpha_i$,k) is determined according to $$\alpha_{i,k} = \frac{\Sigma_{j=1}^{N_{j,k}} \log_{10}\left(\frac{d_{i,k,j}}{d_0}\right)\left(M\left(RSSI_{d_0}\right) - RSSI_{i,k,j}\right)}{10\,\Sigma_{j=1}^{N_{j,k}} \log_{10}^2\left(\frac{d_{i,k,j}}{d_0}\right)}$$

wherein j=1, . . . , $N_{j,k}$ denotes the j-th measurement in a k-th path segment of a defined path for the i-th radio device, wherein the path segments are defined in a calibration phase.

12. Method according to claim 9, wherein second processing instructions establish a determination of a trajectory of a movement of the user for a second calibration mode, wherein the determination is based on the established locations of the radio devices, the detected received signal field strengths indicators ($RSSI_i$) and the radio signal strength reference value ($M(RSSI_{d_0})$), wherein loss coefficients ($\alpha_i$) are determined by means of a maximum likelihood estimate, wherein residual costs are determined according to a negative log-likelihood function, taking into account the determined loss coefficients ($\alpha_i$) and wherein the residual costs are minimized via the position path.

* * * * *